(12) United States Patent
S et al.

(10) Patent No.: US 12,141,115 B1
(45) Date of Patent: Nov. 12, 2024

(54) EFFICIENT DATA MANIPULATION

(71) Applicant: SAP SE, Walldorf (DE)

(72) Inventors: Sampathkumar S, Bengaluru (IN); Edwin Felix Retnam, Bengaluru (IN); Christoph Birkenhauer, Kronau (DE); Aditya Karanth, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/329,242

(22) Filed: Aug. 28, 2023

(51) Int. Cl.
 *G06F 16/22* (2019.01)

(52) U.S. Cl.
 CPC .................. *G06F 16/2246* (2019.01)

(58) Field of Classification Search
 CPC .................................................. G06F 16/2246
 See application file for complete search history.

(56) References Cited

U.S. PATENT DOCUMENTS

| | | | |
|---|---|---|---|
| 7,139,765 B1* | 11/2006 | Balkany | G06F 16/2246 |
| 7,668,845 B1* | 2/2010 | Lomet | G06F 16/2246 |
| | | | 707/711 |
| 10,248,622 B2* | 4/2019 | Verma | G06F 16/24554 |
| 11,206,426 B2* | 12/2021 | Sugio | H04N 19/463 |
| 11,212,342 B2* | 12/2021 | Lucco | H04L 12/1827 |
| 2012/0254197 A1* | 10/2012 | Kuzmin | G06F 3/04886 |
| | | | 707/751 |

* cited by examiner

*Primary Examiner* — Merilyn P Nguyen
(74) *Attorney, Agent, or Firm* — Fountainhead Law Group, PC (57) ABSTRACT

A tree data model comprising a plurality of generated nodes may be programmatically generated. Each particular node may have a sequence number uniquely identifying the node and identifying its sibling position within the generated nodes. Information on the nodes may be provided to a reporting application which presents a report in a user interface. Information may be received on additional entries inserted into the report by a user of the application. An inserted node may be inserted into the tree data model. The inserted node a subgroup number identifying which generated node of the plurality of generated nodes is the closest preceding sibling to the inserted node and a subordinal number identifying a subgroup sibling position of the inserted node within a plurality of inserted nodes having a same inserted node subgroup number.

20 Claims, 5 Drawing Sheets

EFFICIENT DATA MANIPULATION

BACKGROUND

The present disclosure pertains to databases and in particular to manipulating and querying large and complex data.

Certain software applications are capable of generating reports used to comply with reporting obligations. For example, there are reports with large and complex data that need to be processed and presented to relevant tax authorities in the expected output formats, such as XML, XBRL, JSON, etc.

In prior software applications, it is inefficient and difficult to retrieve and make corrections (e.g., addition, deletion, or modification) in such large complex reporting data using traditional methods. Such inefficiencies may occur in prior software applications which store reporting data in an N-ary tree model with each node having zero or more children. In such models, the hierarchical data may be stored in database with parent child relationships, and the sibling sequence may be identified using a sequence number field. In other tree data models the sibling positions are identified based on the pointers to left and right sibling. There are different advantages and disadvantages to both types of tree data models. For example, using the sequence number field instead of a pointer to left and right sibling may allow efficiency in fetching paged datasets when there are millions of siblings. However, using the sequence number field a disadvantage compared to left-right pointer-based sibling tree data models where resequencing after an insert causes degradation in database write performance.

There is a need for a data model that provides efficiency in fetching datasets while mitigating performance degradation when data is inserted. The present disclosure addresses these issue and others, as further described below.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated. These terms, as used herein, may simply be used for differentiation between different objects or elements.

As mentioned above, certain software applications are capable of generating reports used to comply with reporting obligations. For example, there are reports with large and complex data that need to be processed and presented to relevant tax authorities in the expected output formats, such as XML, XBRL, JSON, etc.

However, in prior software applications, it is inefficient and difficult to retrieve and make corrections (e.g., addition, deletion, or modification) in such large complex reporting data using traditional methods. Such inefficiencies may occur in prior software applications which store reporting data in an N-ary tree model with each node having zero or more children. In such models, the hierarchical data may be stored in database with parent child relationships, and the sibling sequence may be identified using a sequence number field. In other tree data models the sibling positions are identified based on the pointers to left and right sibling. There are different advantages and disadvantages to both types of tree data models. For example, using the sequence number field instead of a pointer to left and right sibling may allow efficiency in fetching paged datasets when there are millions of siblings. However, using the sequence number field a disadvantage compared to left-right pointer-based sibling tree data models where resequencing after an insert causes degradation in database write performance.

For example, in terms of computation, prior systems may have costly insert operations, costly change log maintenance, and costly error log maintenance. These are described below.

With respect to costly insert operations in certain prior systems, when nodes are inserted or deleted into existing large hierarchical data, a performance challenge of resequencing a large sibling dataset can occur in prior systems. Resequencing after an insert causes degradation in database write performance. This is a disadvantage in prior systems of having sequence-based siblings compared to left-right pointer-based siblings. However, certain applications must support large dataset of siblings and so the need for efficient paging exists in some scenarios and left-right pointer-based siblings is not used due to its read performance impact.

With respect to costly change log maintenance in certain prior systems, as the sequence number is updated, this results in change log links to be updated for all changes on rows below an inserted row.

With respect to costly error log maintenance in certain prior systems identifying the right position number of errors may be a challenge if the sequence numbers change frequently.

Figure 1:
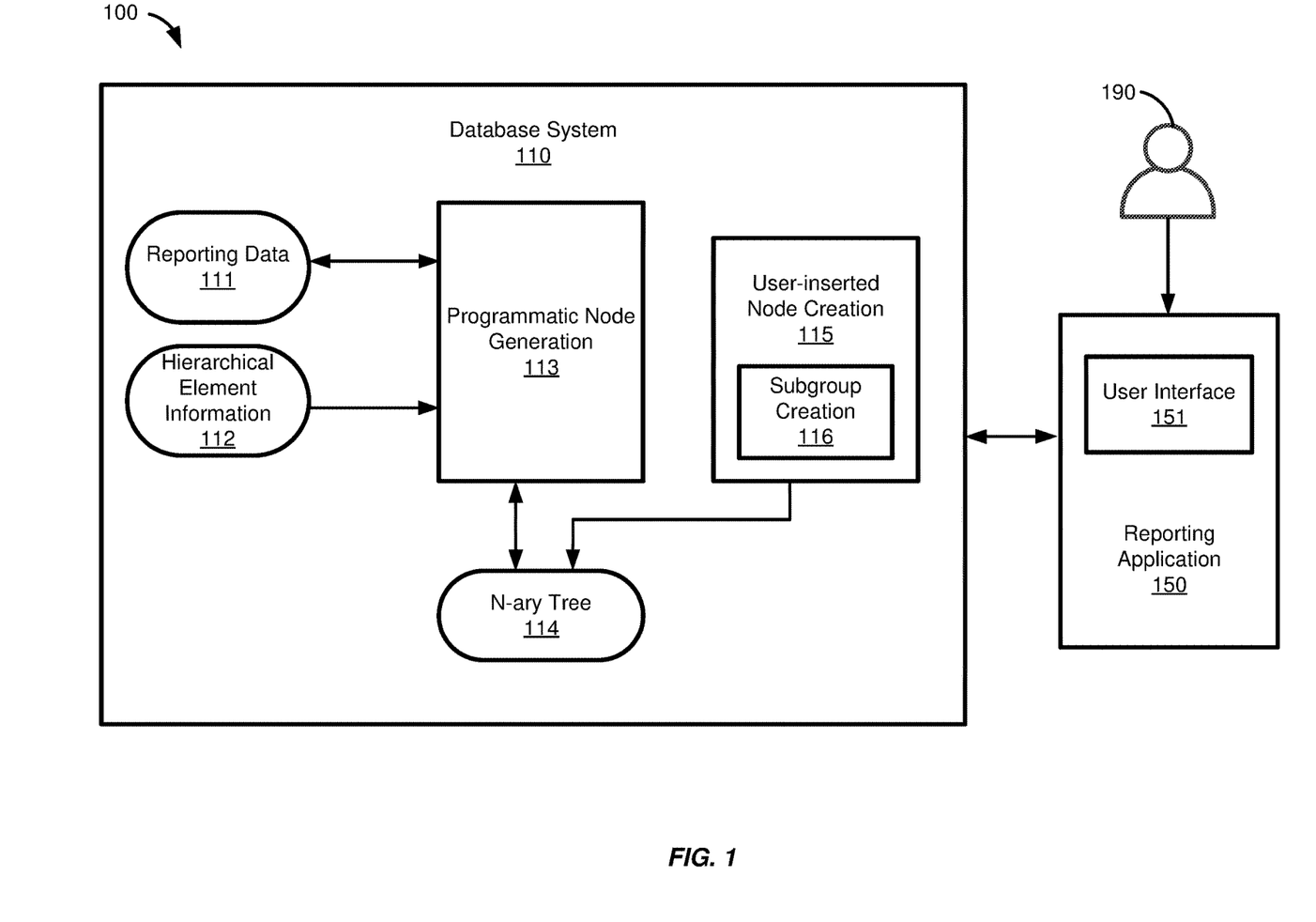
FIG. 1 shows a diagram of database system and reporting application, according to an embodiment.

The present disclosure provides techniques for efficient data manipulation that address these issues and provide performance improvements over prior systems. FIG. 1 shows a diagram 100 of database system 110 and reporting application 150, according to an embodiment. In some embodiments the database system 110 and the reporting application 150 may be part of a cloud system or cloud platform.

The reporting system 150 is used by a user 190 to view reports using a user interface 151. These reports may be large and complex reports. In some embodiments the reports may be used by the user to meet statutory reporting obligations.

The reporting data used to generate the reports may be stored in the database system 110. The reporting data may be stored in an N-ary tree model 114 where each node has 0 or more children, for example. The hierarchical data may be stored in the database 110 with parent child relationship. The sibling sequence may be identified using a sequence number field.

The N-ary Tree 114 may include a plurality of nodes generated by a programmatic node generation component 113. The programmatic node generation component 113 may generate the nodes based on reporting data 111 and hierarchical element information 112. The hierarchical element information 112 may be stored in an element table. The reporting data may be stored in a separate data table. In some embodiments, the parent child relationship between elements may be retrieved from the element table and combined with the parent sequence number and sequence number from the data table to give create the N-ary tree 114.

The hierarchical element information 112 may contain the element ID and parent element ID. The reporting data 111 may contain the element ID, its sequence number (there could be more than one occurrence of the same element) and the parent sequence number (since the parent element could also be occurring multiple times in the final output).

As mentioned above, prior systems that require resequencing the sequence numbers may have performance issues with costly insert operations, costly change log maintenance, and costly error log maintenance since. To mitigate these performance issues the present disclosure introduces the concept of subgroups and subordinal numbers to reduce the number of updates after an insert or delete operation. Previously a sequence number field used to have dual role of uniquely identifying the node as well as showing the position. In the new design described herein, the onus of identifying the position lies on subgroup and subordinal field combination. The sequence number will remain constant, and any new node will receive a new unused sequence number. This technique ensures that the parent child relationships, which rely on the sequence number, need not be adjusted every time a node is inserted, thereby avoiding the performance issues mentioned above.

The database system 110 includes a user-inserted node creation component 115 configured to create subgroups, subgroup numbers, and subordinal numbers as described herein, and insert nodes into the N-ary tree 114. The inserted nodes created by the user-inserted node creation 115 component are based on information received from the reporting application 150, which contains information input by the user 190 into the user interface 151.

Prior to describing the subgroup technique in detail (FIGS. 3 and 4), a method for efficiently inserting nodes into a tree data model is described.

Figure 2:
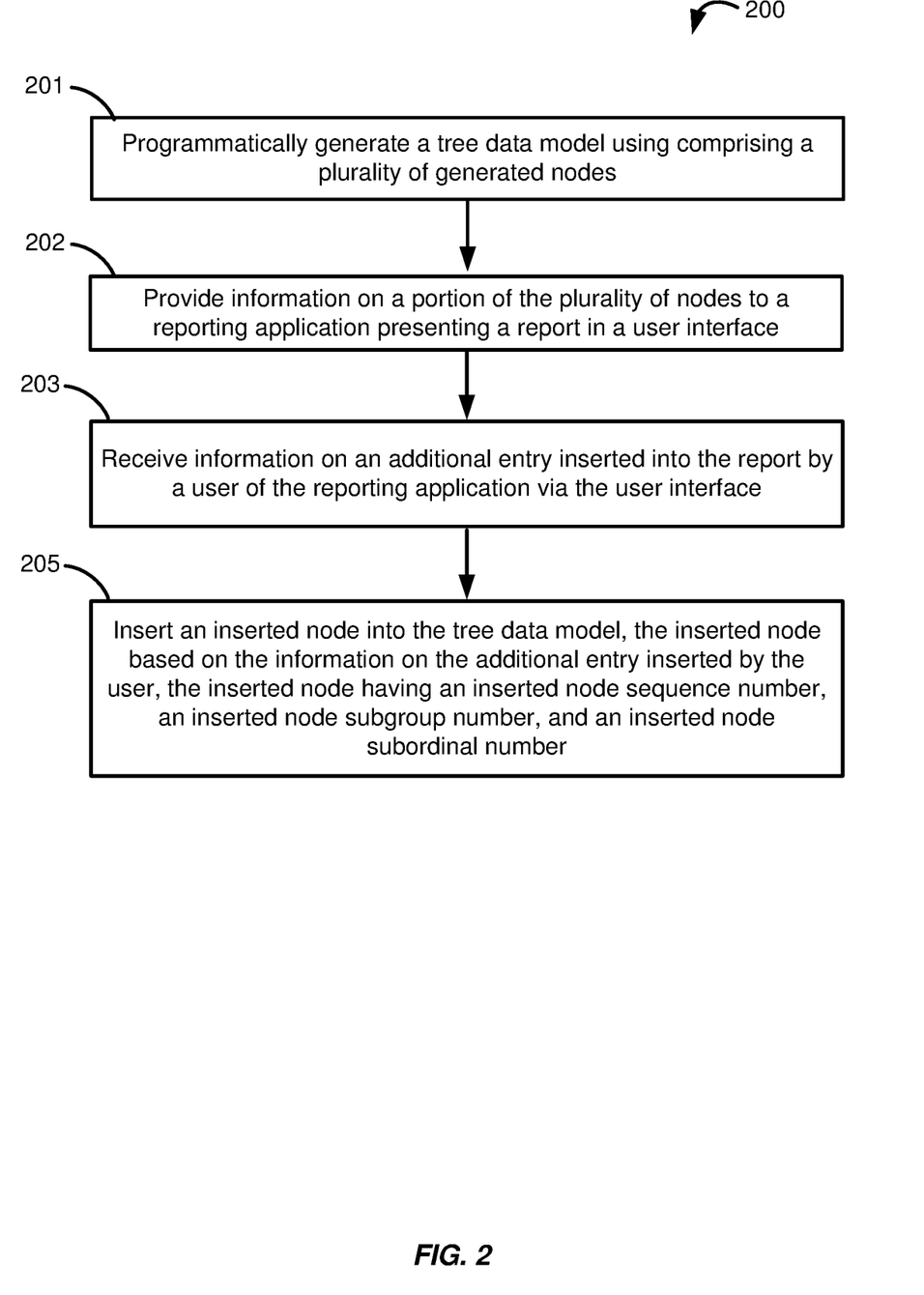
FIG. 2 shows a diagram of a method for efficiently inserting nodes into a tree data model, according to an embodiment.

FIG. 2 shows a diagram 200 of a method for efficiently inserting nodes into a tree data model, according to an embodiment. The method may be performed by a computer system, such as the database system 110 described above with respect to FIG. 1.

At 201, the method may programmatically generate a tree data model using comprising a plurality of generated nodes. In some embodiments the tree data model is an N-ary tree. Each particular node of the plurality of generated nodes may have a sequence number uniquely identifying the particular node and identifying a sibling position of the particular node within the plurality of generated nodes. The programmatic generation of the tree data model may be based on a data table stored in database with a parent child relationship, the data table comprising element identifiers, sequence numbers, parent sequence numbers, subgroup numbers, and subordinal numbers. In some embodiments the parent child relationship between nodes is retrieved from an element table comprising the element identifiers and parent identifiers.

At 202, the method may provide information on a portion of the plurality of nodes to a reporting application presenting a report in a user interface. For example, information a portion of the reporting data 111 of FIG. 1 (e.g., 400 or more entries in the report) may be provided to the reporting application.

At 203, the method may receive information on an additional entry inserted into the report by a user of the reporting application via the user interface. For example, a new entry may be input by a user such as the user 190 of FIG. 1.

At 204, the method may insert an inserted node into the tree data model. The inserted node may be based on the information on the additional entry inserted by the user. The inserted node may have an inserted node sequence number, an inserted node subgroup number, and an inserted node subordinal number. Subgroup numbers and subordinal numbers are described in further detail below with respect to FIGS. 3 and 4.

The inserted node sequence number may uniquely identify the inserted node within the tree data model.

The inserted node subgroup number may identify which generated node of the plurality of generated nodes is the closest preceding sibling to the inserted node.

The inserted node subordinal number may identify a subgroup sibling position of the inserted node within a plurality of inserted nodes having the same inserted node subgroup number.

The combination of the inserted node subgroup number and the inserted node subordinal number may identify the sibling position of the inserted node within the tree data model.

In some embodiments, the user interface provides position numbers for nodes displayed within the user interface, the position numbers determined using an offset based on subgroup numbers and subordinal numbers.

The sequence numbers of the plurality of generated nodes may remain unchanged during and after insertion of the inserted node into the tree data model. Also, any database updates after insertion of a node having a particular subgroup number are limited to other nodes also having the particular subgroup number. Features and advantages of the present disclosure include providing for user-insertion of nodes that are inserted into a tree data model without resequencing of sequence numbers for nodes following the inserted nodes while still maintaining the performance advantages of using sequence numbers over left and right sibling techniques. These aspects are described in further detail below with respect to FIGS. 3 and 4.

Figure 3:
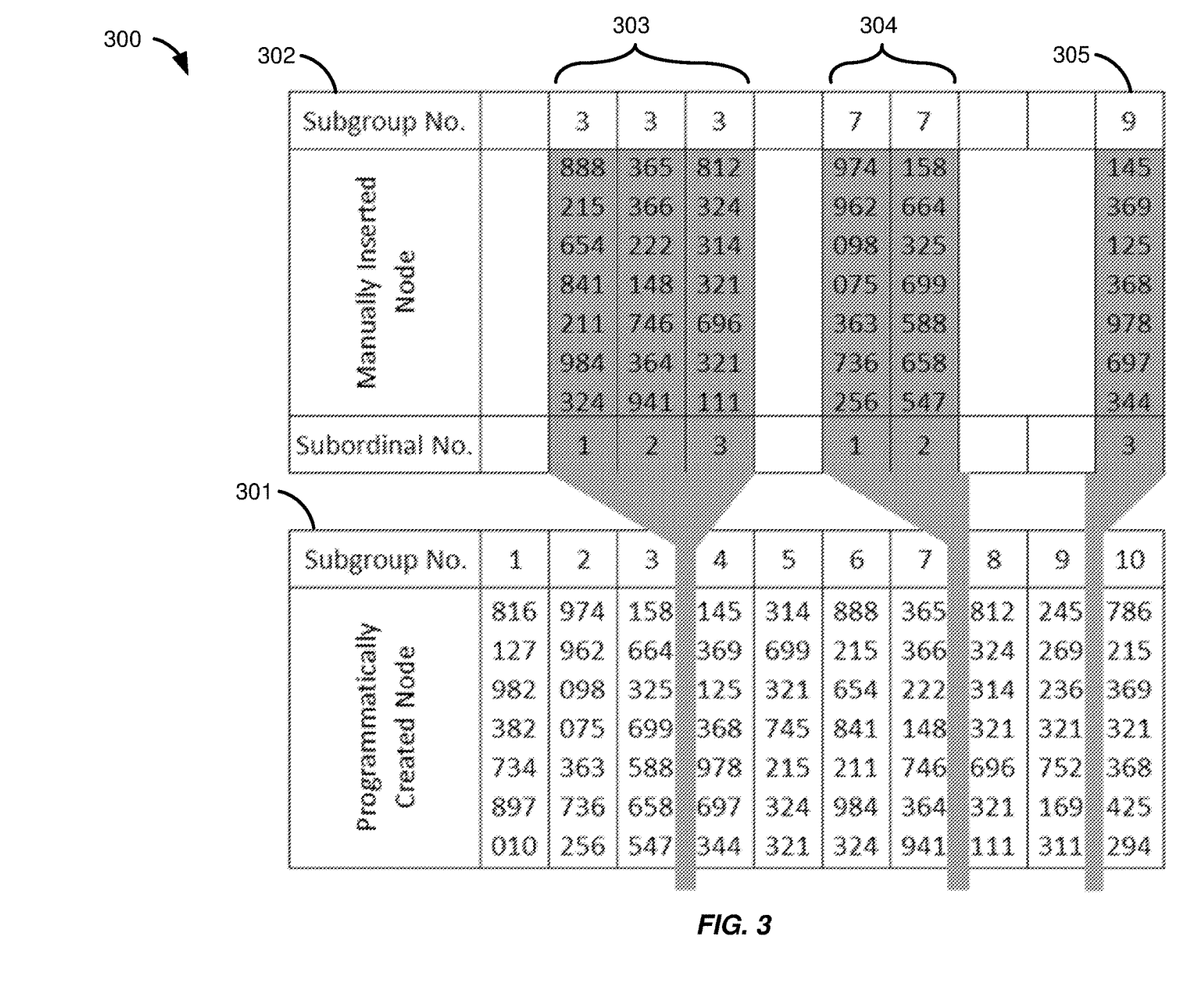
FIG. 3 shows a diagram of manually inserted nodes inserted between programmatically created nodes, according to an embodiment.

FIG. 3 shows a diagram 300 of manually inserted nodes 302 inserted between programmatically created nodes 301, according to an embodiment. As mentioned above, the concept of subgroups and subordinal numbers can reduce the number of updates after an insert/delete operation. In this technique, identifying the position lies on subgroup and subordinal field combination. The sequence number will remain constant, and any new node will receive a new unused sequence number. This allows to ensure that the parent child relationships which rely on the sequence number need not be adjusted every time a node is inserted. After describing the fields, the example shown in FIG. 3 will be described.

A subgroup may be defined as the list of Manually Inserted Nodes right below a Programmatically Created Node. Within the subgroup the node sequence is retained by Subordinal No.

When a new node is added within a subgroup, the Subordinal No. of subsequent nodes in the subgroup is updated. This way the updating of many nodes is avoided. Rather, updates are limited to a small subgroup.

The new node may have a new unique sequence number as a result none of the child nodes have to be updated to maintain the integrity of parent child relationship. This further reduces the number of updates on database.

The Subgroup No. of a programmatically created node may be same as the Sequence No. This may be useful as sorting on Subgroup No. and Subordinal No. may then show the data in their right positions. The Sequence No., Subgroup No., and Subordinal No. may technical information hidden from the consumer. Instead, the number displayed to a user may be the Ordinal No. which will be the position based on the sort order mentioned earlier.

Referring back to FIG. 3, this diagram 300 shows three manually inserted nodes 303 with subgroup number 3 being inserted after the programmatically created node with subgroup number 3, which for that programmatically created node is the same as its sequence number of 3, since the subgroup and sequence numbers of programmatically creates nodes may be the same. To refer back to language previously used, the programmatically created node with sequence number 3 and subgroup number 3 is the closest preceding programmatically generated node to these three inserted nodes.

This diagram 300 also shows two nodes 304 with subgroup number 7 being inserted after programmatically created node with subgroup number 7. It also shows a single node 305 with subgroup number 9 being inserted after programmatically created node with subgroup number 9.

By using subgroup numbers in this way, the manually inserted nodes may be inserted into the tree data model without disrupting the sequence numbering of the programmatically created nodes. Metaphorically speaking, the nodes in the subgroups are "hung" onto the closest preceding node that is programmatically created, without causing sequence numbers to be changed, rather than "pushing" subsequent nodes down, changing their sequence numbers.

A simpler example is now provided to clarify the point that sequence numbers of programmatically created nodes are not changed when the inserted nodes use subgroups as described herein. In this example, a database contains the following nodes.

| Element ID | Sequence No | Previous Sequence No | Subordinal No |
|---|---|---|---|
| 000000002 | 1 | 1 | 0 |
| 000000002 | 2 | 2 | 0 |
| 000000002 | 3 | 3 | 0 |
| 000000002 | 4 | 4 | 0 |
| 000000002 | 5 | 5 | 0 |
| 000000002 | 6 | 6 | 0 |
| 000000002 | 7 | 7 | 0 |
| 000000002 | 8 | 8 | 0 |
| 000000002 | 9 | 9 | 0 |
| 000000002 | 10 | 10 | 0 |

In this example, a user enters two nodes after the 3rd row the data will be updated as follows:

| Element ID | Sequence No | Previous Sequence No | Subordinal No |
|---|---|---|---|
| 000000002 | 1 | 1 | 0 |
| 000000002 | 2 | 2 | 0 |
| 000000002 | 3 | 3 | 0 |
| 000000002 | 11 | 3 | 1 |
| 000000002 | 12 | 3 | 2 |
| 000000002 | 4 | 4 | 0 |
| 000000002 | 5 | 5 | 0 |
| 000000002 | 6 | 6 | 0 |
| 000000002 | 7 | 7 | 0 |
| 000000002 | 8 | 8 | 0 |
| 000000002 | 9 | 9 | 0 |
| 000000002 | 10 | 10 | 0 |

To expand this example, another row is inserted between the newly inserted rows and the database makes updates for the highlighted section:

| Element ID | Sequence No | Previous Sequence No | Subordinal No |
|---|---|---|---|
| 000000002 | 1 | 1 | 0 |
| 000000002 | 2 | 2 | 0 |
| 000000002 | 3 | 3 | 0 |
| 000000002 | 11 | 3 | 1 |
| 000000002 | 13 | 3 | 2 |
| 000000002 | 12 | 3 | 2 |
| 000000002 | 4 | 4 | 0 |
| 000000002 | 5 | 5 | 0 |
| 000000002 | 6 | 6 | 0 |
| 000000002 | 7 | 7 | 0 |
| 000000002 | 8 | 8 | 0 |
| 000000002 | 9 | 9 | 0 |
| 000000002 | 10 | 10 | 0 |

Figure 4:
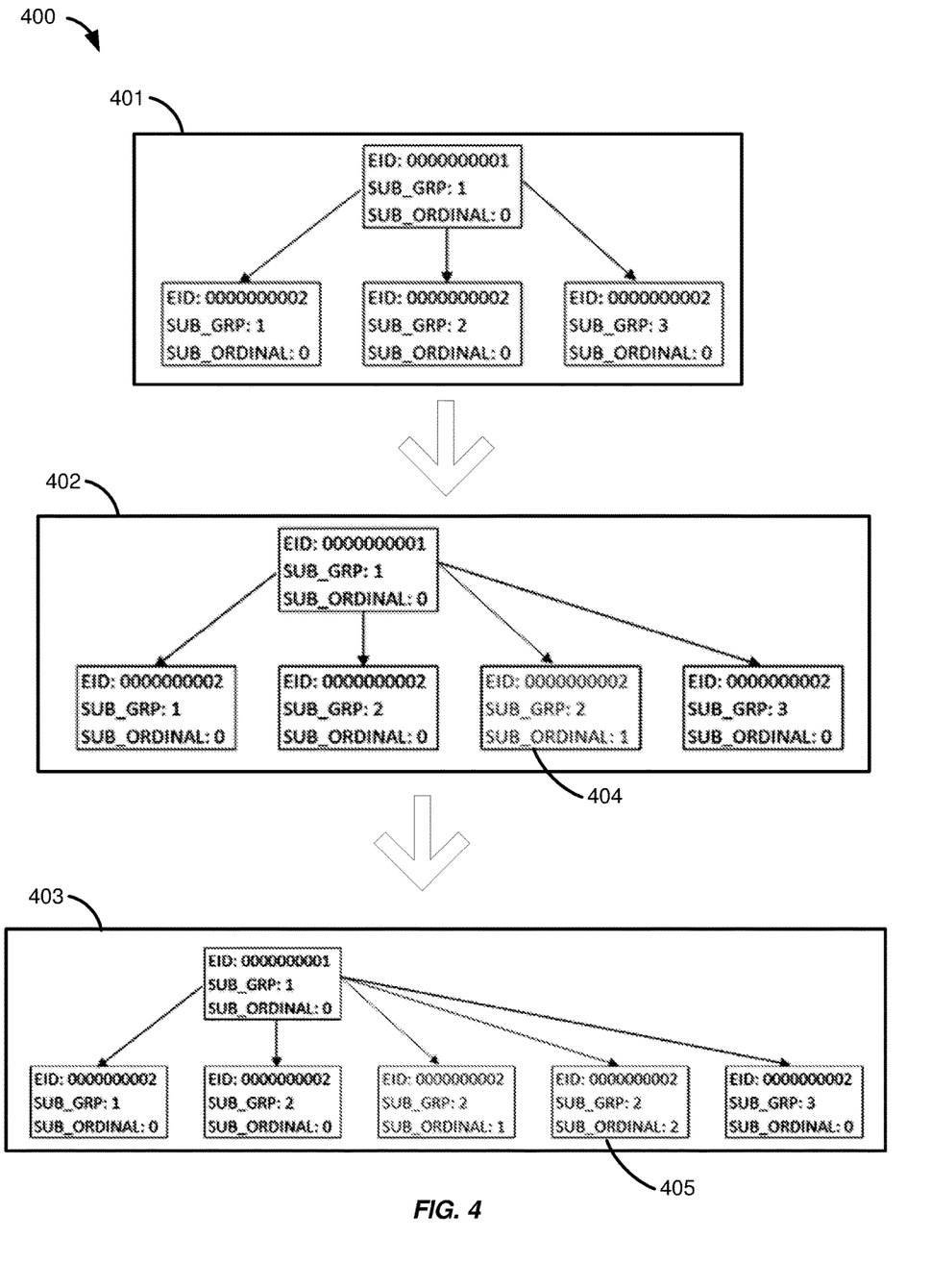
FIG. 4 shows a diagram of nodes being inserted into a tree data model, according to an embodiment.

Another insertion example is provided. FIG. 4 shows a diagram 400 of nodes being inserted into a tree data model, according to an embodiment. The original tree 401 has a first node 404 inserted into it, resulting in tree 402. Then a second node 405 is inserted into the tree 402, resulting in tree 403.

As mentioned above, to get around the insertion performance issues of prior systems, the concept of subgroups is used. The subgroup is a set of sibling nodes inserted by users manually over the data generated by a generator. Fields are created to identify subgroups and the sequence within that subgroup: one field will hold the sequence number of the generated node right above the group of newly inserted node called the subgroup number, and another to hold the sequence number within the subgroup called subordinal number.

For generated nodes, the subgroup number and sequence number may be same, and the subordinal number will be 0.

For nodes inserted by user, the subgroup number may be the sequence number of the preceding generated node, and the subordinal number will be a natural number (non-zero positive integer). The dataset will be ordered by subgroup number and sequence number so that the data can be retrieved in pages and correct sequence. Any new insert will only result in resequencing the subgroup only.

Furthermore, an algorithm to calculate positions numbers on a small subset within the application is described below. This is useful since generating position numbers using database features may result in a high read cost. The positions where the new nodes are inserted are identified and the position numbers of subsequent nodes are adjusted based on the selected page. Having a constant sequence number enables the maintenance of change log and error logs simple.

A technique for generating position numbers for a single page in a reporting application is now described. The window functions provided by database runs on the entire dataset, but the application may only need the position numbers for the dataset displayed in the current page only (which may be around 400). There are two different scenarios.

Scenario 1: Read operation which shows all siblings in a sequence. In this case we follow the below algorithm.
1. Get the number of user inserted siblings before the first visible sibling in current page, let's call it offset
2. Fetch entries sorted by subgroup number and subordinal number
4. For each node: Get the subgroup number of current node; For every node where subordinal number is greater than 0 add one to a counter; Position Number=subgroup number+offset+counter Scenario 2: Search/filter operation which returns siblings that meet a search/filter criterion. In this case we make a slight tweak to the above algorithm
1. Create a list with subgroup numbers and the number of entries in each subgroup. This list will only have those subgroups with 2 or more nodes. Let's call this inserted_node_list
2. For each Search/filter result set: Check if it is user inserted node or generated node by reading inserted_node_list.
For a User Inserted Node: Add 1 to variable P and Assign the position in inserted_node_list to A
For a Generated Node: Assign subgroup number to P, Loop at all entries in inserted_node_list where subgroup number is lesser than current node and add all to A, and Loop at all entries in inserted_node_list where subgroup number is same but subordinal number is less than current node and add all to A. P+A=Position Number Features and advantages of the techniques described herein include faster create, read, update, and delete (CRUD) operations, limiting the number of database updates after an insert or delete to the few nodes in a subgroup, faster dynamic position number generation, the ability to support Move Up or Move Down operations on sibling nodes with lower number of database updates, and zero impact on parent child relationship keys as the sequence number remains same for a given node for the tree lifetime. These techniques also solve the problem for large list data where node/row/item positions must be maintained after every insert/delete operation.

Example Hardware

Figure 5:
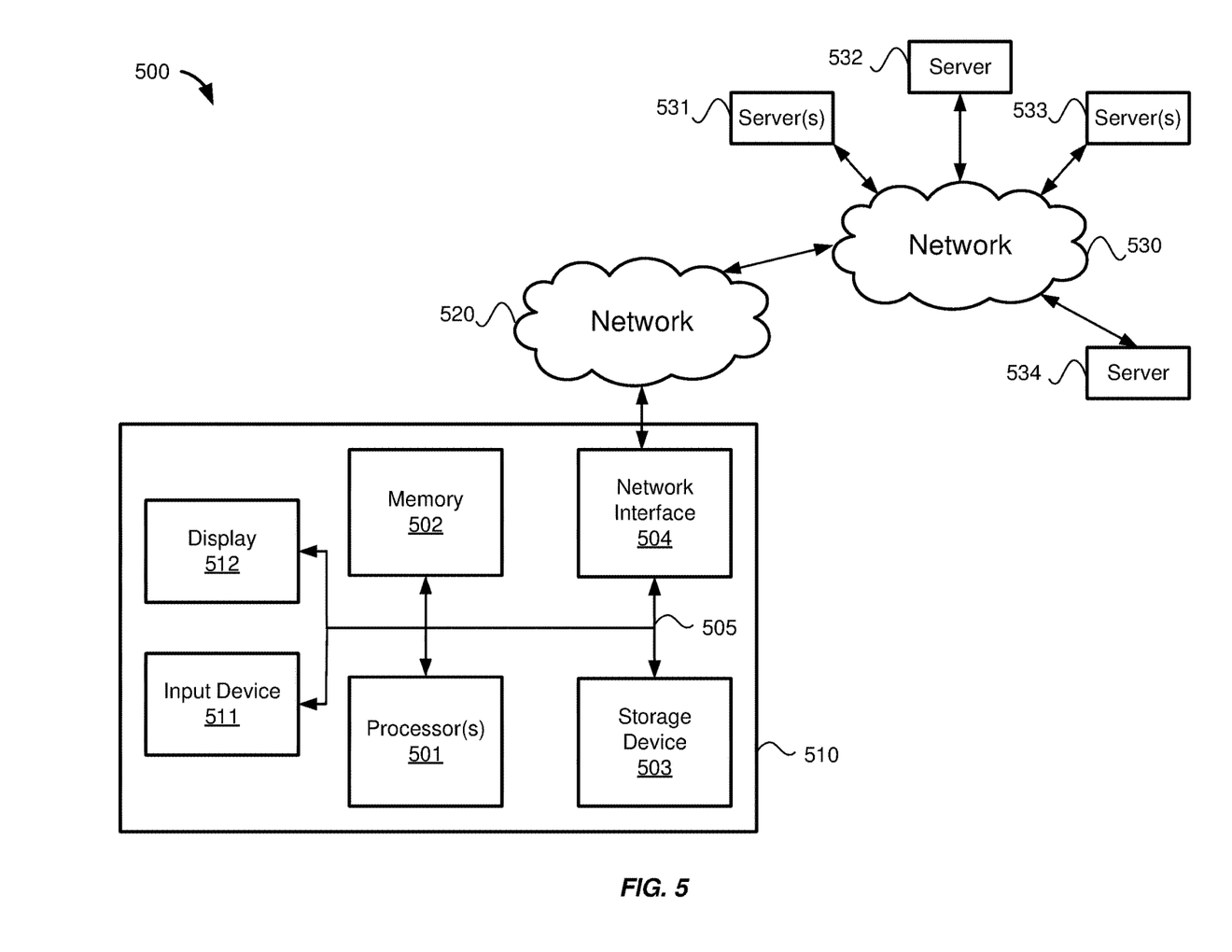
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

What is claimed is:

1. A computer system, comprising:
   one or more processors;
   one or more machine-readable medium coupled to the one or more processors and storing computer program code comprising sets instructions executable by the one or more processors to:
   programmatically generate a tree data model comprising a plurality of generated nodes, each particular node of the plurality of generated nodes having a sequence number uniquely identifying the particular node and identifying a sibling position of the particular node within the plurality of generated nodes;
   provide information on a portion of the plurality of nodes to a reporting application presenting a report in a user interface;

receive information on an additional entry inserted into the report by a user of the reporting application via the user interface; and insert an inserted node into the tree data model, the inserted node based on the information on the additional entry inserted by the user, the inserted node having an inserted node sequence number, an inserted node subgroup number, and an inserted node subordinal number, the inserted node sequence number uniquely identifying the inserted node within the tree data model, the inserted node subgroup number identifying which generated node of the plurality of generated nodes is the closest preceding sibling to the inserted node, the inserted node subordinal number identifying a subgroup sibling position of the inserted node within a plurality of inserted nodes having a same inserted node subgroup number, a combination of the inserted node subgroup number and the inserted node subordinal number identifying a sibling position of the inserted node within the tree data model.

2. The computer system of claim 1, wherein the sequence numbers of the plurality of generated nodes are unchanged during and after insertion of the inserted node into the tree data model.

3. The computer system of claim 1, wherein the programmatic generation of the tree data model is based on a data table stored in database with a parent child relationship, the data table comprising element identifiers, sequence numbers, parent sequence numbers, subgroup numbers, and subordinal numbers.

4. The computer system of claim 3, wherein the parent child relationship between nodes is retrieved from an element table comprising the element identifiers and parent identifiers.

5. The computer system of claim 1, wherein database updates after insertion of a node having a particular subgroup number are limited to other nodes also having the particular subgroup number.

6. The computer system of claim 1, wherein the user interface provides position numbers for nodes displayed within the user interface, the position numbers determined using an offset based on subgroup numbers and subordinal numbers.

7. The computer system of claim 1, wherein the tree data model is an N-ary tree.

8. A non-transitory computer-readable medium storing computer program code comprising sets of instructions to:

programmatically generate a tree data model comprising a plurality of generated nodes, each particular node of the plurality of generated nodes having a sequence number uniquely identifying the particular node and identifying a sibling position of the particular node within the plurality of generated nodes;

provide information on a portion of the plurality of nodes to a reporting application presenting a report in a user interface;

receive information on an additional entry inserted into the report by a user of the reporting application via the user interface; and insert an inserted node into the tree data model, the inserted node based on the information on the additional entry inserted by the user, the inserted node having an inserted node sequence number, an inserted node subgroup number, and an inserted node subordinal number, the inserted node sequence number uniquely identifying the inserted node within the tree data model, the inserted node subgroup number identifying which generated node of the plurality of generated nodes is the closest preceding sibling to the inserted node, the inserted node subordinal number identifying a subgroup sibling position of the inserted node within a plurality of inserted nodes having a same inserted node subgroup number, a combination of the inserted node subgroup number and the inserted node subordinal number identifying a sibling position of the inserted node within the tree data model.

9. The non-transitory computer-readable medium of claim 8, wherein the sequence numbers of the plurality of generated nodes are unchanged during and after insertion of the inserted node into the tree data model.

10. The non-transitory computer-readable medium of claim 8, wherein the programmatic generation of the tree data model is based on a data table stored in database with a parent child relationship, the data table comprising element identifiers, sequence numbers, parent sequence numbers, subgroup numbers, and subordinal numbers.

11. The non-transitory computer-readable medium of claim 10, wherein the parent child relationship between nodes is retrieved from an element table comprising the element identifiers and parent identifiers.

12. The non-transitory computer-readable medium of claim 8, wherein database updates after insertion of a node having a particular subgroup number are limited to other nodes also having the particular subgroup number.

13. The non-transitory computer-readable medium of claim 8, wherein the user interface provides position numbers for nodes displayed within the user interface, the position numbers determined using an offset based on subgroup numbers and subordinal numbers.

14. The non-transitory computer-readable medium of claim 8, wherein the tree data model is an N-ary tree.

15. A computer-implemented method, comprising:

programmatically generating a tree data model comprising a plurality of generated nodes, each particular node of the plurality of generated nodes having a sequence number uniquely identifying the particular node and identifying a sibling position of the particular node within the plurality of generated nodes;

providing information on a portion of the plurality of nodes to a reporting application presenting a report in a user interface;

receiving information on an additional entry inserted into the report by a user of the reporting application via the user interface; and inserting an inserted node into the tree data model, the inserted node based on the information on the additional entry inserted by the user, the inserted node having an inserted node sequence number, an inserted node subgroup number, and an inserted node subordinal number, the inserted node sequence number uniquely identifying the inserted node within the tree data model, the inserted node subgroup number identifying which generated node of the plurality of generated nodes is the closest preceding sibling to the inserted node, the inserted node subordinal number identifying a subgroup sibling position of the inserted node within a plurality of inserted nodes having a same inserted node subgroup number, a combination of the inserted node subgroup number and the inserted node subordinal number identifying a sibling position of the inserted node within the tree data model.

16. The computer-implemented method of claim 15, wherein the sequence numbers of the plurality of generated nodes are unchanged during and after insertion of the inserted node into the tree data model.

17. The computer-implemented method of claim 15, wherein the programmatic generation of the tree data model is based on a data table stored in database with a parent child relationship, the data table comprising element identifiers, sequence numbers, parent sequence numbers, subgroup numbers, and subordinal numbers.

18. The computer-implemented method of claim 7, wherein the parent child relationship between nodes is retrieved from an element table comprising the element identifiers and parent identifiers.

19. The computer-implemented method of claim 15, wherein database updates after insertion of a node having a particular subgroup number are limited to other nodes also having the particular subgroup number.

20. The computer-implemented method of claim 15, wherein the user interface provides position numbers for nodes displayed within the user interface, the position numbers determined using an offset based on subgroup numbers and subordinal numbers.

\* \* \* \* \*